(No Model.)

J. W. ALKIRE.
HARVESTER.

No. 598,192.

2 Sheets—Sheet 1.

Patented Feb. 1, 1898.

Witnesses
Jas. V. McCathran
O. E. Doyle

Inventor
John W. Alkire
By his Attorneys.
C. A. Snow & Co.

(No Model.) 2 Sheets—Sheet 2.

J. W. ALKIRE.
HARVESTER.

No. 598,192. Patented Feb. 1, 1898.

Witnesses
Jas. K. McCathran
O. F. Hoyle

Inventor
John W. Alkire
By his Attorneys,
C. A. Snow & Co.

UNITED STATES PATENT OFFICE.

JOHN W. ALKIRE, OF EATON, OHIO.

HARVESTER.

SPECIFICATION forming part of Letters Patent No. 598,192, dated February 1, 1898.

Application filed December 24, 1896. Serial No. 616,930. (No model.)

*To all whom it may concern:*

Be it known that I, JOHN W. ALKIRE, a citizen of the United States, residing at Eaton, in the county of Preble and State of Ohio, have invented a new and useful Harvester, of which the following is a specification.

My invention relates to harvesting-machines, and particularly to an improved construction and arrangement of platform upon which cut grain is deposited; and the object in view is to provide a platform and conveyers or carrier-belts of such construction and arrangement that while the grain-wheel is transversely opposite the driving or ground wheel, thus disposing the cutter-bar diagonally with relation to the path of the machine, the grain is discharged transversely in rear of the driving or ground wheel and transversely with relation to the path of the machine.

A further object of the invention is to provide improved means for adjusting the elevation of the cutter-bar to vary the distance of the cut from the surface of the soil.

Further objects and advantages of this invention will appear in the following description, and the novel features thereof will be particularly pointed out in the appended claims.

Figure 1:
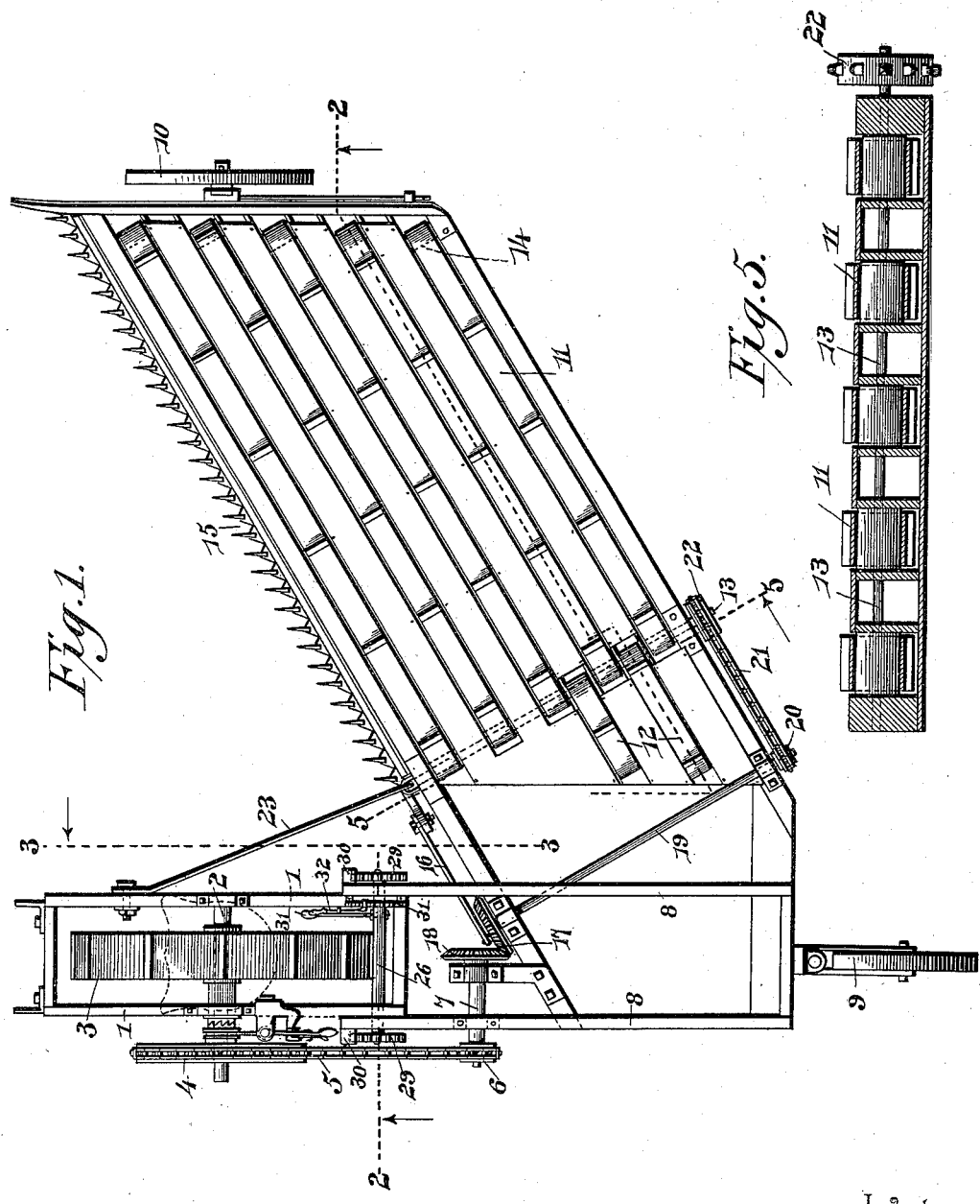
Figure 2:
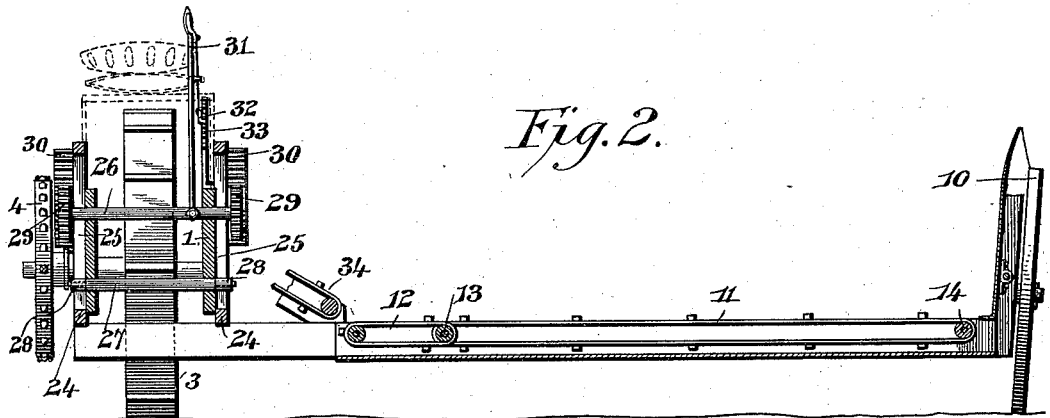
Figure 3:
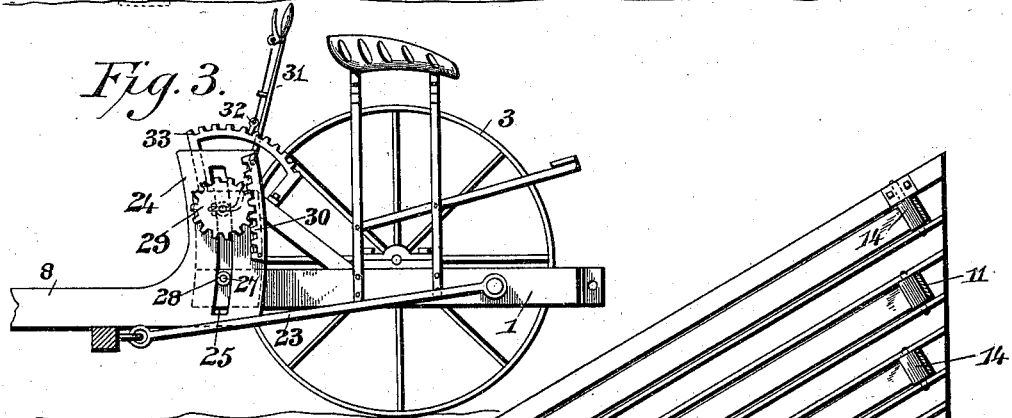
Figure 4:
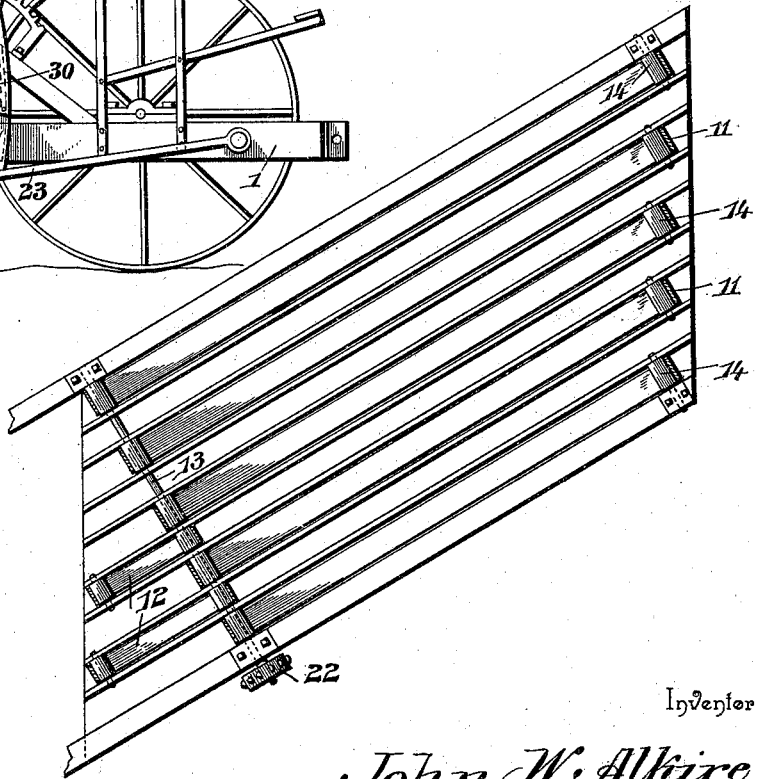

In the drawings, Figure 1 is a plan view of a harvester constructed in accordance with my invention. Fig. 2 is a transverse section of the same on the line 2 2 of Fig. 1. Fig. 3 is a side view of a portion of the machine, shown partly in longitudinal section on the line 3 3 of Fig. 1. Fig. 4 is a horizontal section of the platform. Fig. 5 is a transverse section of the platform on the line 5 5 of Fig. 1.

Similar numerals of reference indicate corresponding parts in all the figures of the drawings.

In the parallel-sided main or driving-wheel frame 1 is mounted the spindle 2 of the driving or ground wheel 3, a limber tongue (not shown) being adapted to be used in connection with said frame, whereby the draft-animals are relieved of the weight of the front end of the mechanism. Carried by a lateral extension of the driving-wheel spindle is a main sprocket-wheel 4, which is connected by means of a chain 5 with a sprocket-pinion 6, of which the spindle 7 is mounted on the platform-frame 8. This platform-frame is provided at its rear end with a caster-wheel 9 and at its grain end with a grain-wheel 10, the laterally-extending portion of the platform-frame being disposed diagonally or with its grain end in advance of the other or outer end to arrange the grain-wheel 10 transversely opposite the driving or ground wheel 3, as shown in Fig. 1. The diagonal disposition of the lateral portion of the platform-frame arranges the outer end thereof in rear of the ground-wheel to discharge cut grain without the necessity of using an elevator of sufficient height to carry the grain over the ground-wheel, as in the ordinary construction, it being understood that an elevator may be used in connection with the apparatus or not, as may be preferred, the same, however, being unnecessary in view of the construction herein described.

It is desirable, however, to employ in connection with the platform means for discharging the cut grain transversely, or in a direction at right angles to the path of the machine, instead of diagonally, as from the end of a diagonally-disposed platform, and in order to accomplish this preferred direction of delivery I employ, in addition to the main conveyer-belts 11, a series of short or auxiliary conveyer-belts 12 of graded lengths, which, however, traverse and receive motion from pulleys which are carried by a pulley-spindle 13, common to the main belts 11. In other words, the pulley-spindle 13 is disposed at the intersection of the main and auxiliary conveyer-belts, or on the line upon which said main and auxiliary belts overlap. This line of intersection or overlapping of the contiguous ends of the main and auxiliary belts is located at an intermediate point of the platform-frame and transversely of the lateral portion of said frame, and hence motion is communicated to all of the belts by means of a common shaft and operating mechanism. The outer ends of the auxiliary belts are located upon a line which is parallel with the direction of movement of the machine, and hence it is obvious that the grain is discharged in a direction transverse to the path of the machine instead of diagonally, as it would be if the auxiliary belts were omitted.

The grain ends of the main belts traverse direction-pulleys 14, which are located upon a line parallel with the direction of movement of the machine. Obviously the cutting mechanism 15, including the usual or any preferred construction of cutter-bar and guard-fingers, is arranged upon a diagonal line corresponding with the front side of the platform-frame, and motion is preferably communicated to the moving member, as the cutter-bar, of said cutting mechanism by means of a pitman 16, which receives motion from a gear 17, meshing with a corresponding gear 18 on the spindle 7 of the sprocket-pinion. Motion is communicated to the pulley-spindle 13 by means of a shaft 19, carrying said gear 17 and having a chain-wheel 20, connected by means of a chain 21 with a second chain-wheel 22 on the pulley-spindle. A terminally-pivoted brace 23 is preferably employed to connect the main or driving-wheel frame 1 with the front bar of the lateral projection of the platform-frame 8.

The platform-frame is provided at its outer end, contiguous to the rear end of the main or driving-wheel frame, with upright brackets or extensions 24, having segmental or curved slots 25, which are concaved toward the rear end of the platform-frame to receive a transverse guide-spindle 26 and a subjacent guide-rod 27. The guide-rod is preferably provided with antifriction-sleeves 28, which operate in the slots 25, and the guide-spindle 26 is provided with terminal spur-gears 29, which mesh with racks 30, rigidly secured to the extensions or brackets 24.

It will be seen that by adjusting the guide-spindle to cause the gears 29 to traverse the racks 30 the front of the platform-frame may be adjusted vertically with relation to the main or driving-wheel frame, the depression or breaking of the joint between said platform and driving-wheel frames being prevented by the double bearing afforded by the engagement of the guide-spindle 26 and guide-rod 27 with the segmental slots 25. Any suitable means may be employed for securing this rotary adjustment of the guide-spindle to vary the vertical adjustment of the front of the platform-frame; but in the drawings I have illustrated an adjusting-lever 31 secured to said spindle and having a locking device, as a pawl 32, to engage a toothed segment 33 and secure said lever at the desired adjustment.

In Fig. 2 I have shown the lower or grain end of an elevator 34 adapted to be used in connection with the conveyer mechanism hereinbefore described; but it will be understood that while desirable under some circumstances the use of such or of any elevator is not indispensable, and therefore it has been deemed unnecessary to illustrate the same in detail in the drawings.

Various changes in the form, proportion, and the minor details of construction may be resorted to without departing from the spirit or sacrificing any of the advantages of this invention.

Having described my invention, what I claim is—

1. In a harvester, the combination with a supporting-frame and transversely opposite driving and grain wheels, of a platform disposed diagonally with relation to the path of the machine, and having devices consisting of conveyer-belts of which both the outermost and innermost carrying or guiding devices are arranged on lines parallel with the path of the machine, substantially as specified.

2. In a harvester, the combination with a supporting-frame and transversely opposite driving and grain wheels, of a platform disposed diagonally with relation to the path of the machine, and a conveyer comprising parallel main and auxiliary conveyer-belts having contiguous and remote guiding devices of which the latter are arranged on lines parallel with the path of the machine, substantially as specified.

3. In a harvester, the combination with a supporting-frame and transversely opposite driving and grain wheels, of a platform diagonally disposed with relation to the path of the machine, main and auxiliary conveyer-belts disposed on lines parallel with the platform and having overlapping contiguous ends, coaxial means for guiding the contiguous ends of the belts, and guiding devices arranged in lines parallel with the path of the machine for supporting the remote ends of the conveyers, substantially as specified.

4. In a harvester, the combination with a supporting-frame and transversely opposite driving and grain wheels, of a platform disposed diagonally with relation to the path of the machine, a drive-spindle arranged perpendicular to the front side of the platform, operating devices for the spindle, main and auxiliary conveyer-belts arranged parallel with the front side of the platform and traversing, at their contiguous ends, pulleys on said drive-spindle, guide-pulleys for the remote ends of the belts arranged on lines parallel with the path of the machine, substantially as specified.

5. In a harvester, the combination with a supporting-frame and transversely opposite driving and grain wheels, of a platform disposed diagonally with relation to the path of the machine, conveyer-belts arranged parallel with the front side of the platform and having their remote extremities arranged to traverse guiding devices disposed upon lines parallel with the path of the machine, cutting mechanism including a cutter-bar mounted at and parallel with the front side of the platform, an operating-wheel arranged in the plane of the cutter-bar and operatively connected with the driving-wheel and also with the cutter-bar, and connections between said operating-wheel and the guiding devices for the belts, substantially as specified.

6. In a harvester, the combination with a main or driving-wheel frame, of a platform-frame carrying cutting and conveying mechanisms, and adjusting devices connecting the front of the platform-frame with the main frame, said devices including a slotted extension or bracket on one of the frames engaged by guiding devices on the other frame, and means, as engaging racks and pinions, carried respectively by the frames for relatively adjusting the parts, substantially as specified.

7. In a harvester, the combination with a main or driving-wheel frame, of a platform-frame carrying cutting and conveying mechanisms and having a slotted extension or bracket, spaced upper and lower guiding devices carried by the main frame and operating in the slots of said extensions or brackets, and means, as pinions, mounted on the main frame engaging racks on the extensions or brackets, for varying the elevation of the front of the platform-frame, substantially as specified.

8. In a harvester, the combination with a main or driving-wheel frame, of a platform-frame carrying cutting and conveying mechanisms and having slotted extensions or brackets, spaced guiding devices, as a guide-spindle and a guide-rod, carried by the main frame and operating in the slots of said extensions or brackets, pinions carried by the guide-spindle and engaging racks on the extensions or brackets, and means for turning the spindle to cause the pinions to traverse the racks to vary the elevation of the front of the platform-frame with relation to the main frame, substantially as specified.

9. In a harvester, the combination with a main or driving-wheel frame, of a platform-frame carrying cutting and conveying mechanisms and having slotted extensions or brackets between which the contiguous end of the main frame is fitted, upper and lower guiding devices on the main frame fitting in the slots of said extensions or brackets, pinions mounted upon the main frame and meshing with racks on the extensions or brackets, and means, as a hand-lever, a locking-pawl and a toothed segment, for turning the pinions and securing the latter at the desired adjustment, substantially as specified.

In testimony that I claim the foregoing as my own I have hereto affixed my signature in the presence of two witnesses.

JOHN W. ALKIRE.

Witnesses:
J. W. KING,
H. A. SCHURTZ.